United States Patent [19]
Akiyama et al.

[11] Patent Number: 5,625,496
[45] Date of Patent: Apr. 29, 1997

[54] LENS FOR PROJECTION TELEVISION

[75] Inventors: Kazuya Akiyama; Yukio Ozaki, both of Tokyo, Japan

[73] Assignee: Pioneer Electronic Corporation, Tokyo, Japan

[21] Appl. No.: 440,036

[22] Filed: May 12, 1995

Related U.S. Application Data

[63] Continuation of Ser. No. 86,169, Jul. 6, 1993.

[30] Foreign Application Priority Data

Jul. 6, 1992 [JP] Japan .................. 4-178168

[51] Int. Cl.$^6$ .................................................. G02B 1/06
[52] U.S. Cl. .................................................. 359/666
[58] Field of Search .................................. 359/665, 666

[56] References Cited

U.S. PATENT DOCUMENTS

| | | | |
|---|---|---|---|
| 4,725,755 | 2/1988 | Hasegawa | 348/832 |
| 4,780,640 | 10/1988 | Hasegawa | 313/36 |
| 4,838,665 | 6/1989 | Hasegawa et al. | 359/665 |

*Primary Examiner*—Georgia Y. Epps
*Assistant Examiner*—Dawn-Marie Bey
*Attorney, Agent, or Firm*—Keck, Mahin & Cate

[57] ABSTRACT

A projection lens for a projection television is made to match different inch sizes of the screen. The kind of coolant material constituting a liquid lens which is attached to the front surface of a projection tube is changed or the coolant is constructed by a plurality of kinds of liquid materials and a mixing ratio of the coolant materials is changed, thereby matching to the inch size of each screen is made.

11 Claims, 2 Drawing Sheets

LENS FOR PROJECTION TELEVISION

This is a continuation of application Ser. No. 08/086,169 filed on Jul. 6, 1993, the text of which is hereby incorporated by reference.

BACKGROUND OF THE INVENTION

1. Field of the Invention

The present invention relates to a liquid lens for use in a projection television.

2. Description of Background Information

As shown in FIG. 2, a lens for use in a projection television typically comprises: a liquid lens 3 made of a coolant which covers a fluorescent surface 1a of a CRT 1; a first group of lenses $g_1$ arranged on the left side in the diagram of the liquid lens 3; and a second group of lenses $g_2$ arranged adjacent to the first group of lenses $g_1$. The liquid lens 3 is enclosed in a coupler 2 attached to the fluorescent surface 1a of the CRT 1. A meniscus lens 2a is formed at the front surface of the coupler 2. The first group of lenses $g_1$ and the second group of lenses $g_2$ form a power lens group G, and the first and second groups of lenses $g_1$ and $g_2$ together with the meniscus lens 2a forms a projection lens L.

In using such a lens L, in order to meet the requirement of various sizes of the screen, a distance between the power lens group G end the meniscus lens 2a is changed, thereby changing the projection magnification. When the projection magnification is changed as mentioned above, however, the image positions deviate in the central portion and peripheral portion of the screen, through the so-called image plane curving phenomenon. As a correcting method for preventing such a phenomenon, the distance between the first group of lenses $g_1$ and the second group of lenses $g_2$, for instance, in the power lens group G is changed or one or a plurality of lenses in the power lens group G are exchanged with other lenses (not shown) in accordance with the screen size. Alternatively, the focal length or the aspherical characteristic of the meniscus lens 2a is changed for such correction purposes.

As prior art relating to the present invention, U.S. Pat. No. 4,725,755 to Hasegawa describes a liquid lens made of a mixed liquid of ethylene glycol and glycerine. In U.S. Pat. No. 4,780,640 to Hasegawa a liquid lens is made of a mixed liquid of 1,3-butylene glycol and glycerine. U.S. Pat. No. 4,838,665 to Yoshioka et al. describes a liquid lens made of a liquid and a gel.

OBJECT AND SUMMARY OF THE INVENTION

To change the distance between a plurality of lens surfaces as mentioned above, however, a complicated lens barrel and coupler structure are necessary, so that the cost is increased because of the costs of a plurality of kinds of molds and the like. On the other hand, a method of changing one or more of the lenses is not practical because the cost to manufacture a metal mold is high.

In consideration of the above circumstances, it is an object of the invention to provide a lens for a projection television which does not require the change in the distances among a plurality of lens surfaces, or the exchange of two lenses in a lens group corresponding to the size of the screen and which can be made to match the screen size by a simple operation.

According to the invention, in a lens for a projector/projection television in which a liquid lens is attached to the front surface of a projection tube, the liquid lens is comprised of a mixture of a plurality of kinds of liquid materials and a mixing ratio of the liquid materials is changed correspondingly to the screen size, or the kinds of liquid materials of the liquid lens are changed correspondingly to the screen else.

The kind of coolant material arranged at the front surface of the projection tube is changed correspondingly to the inch size of screen or the coolant is constructed while changing a mixing ratio of the mixed material of a plurality of kinds of liquids. The refractive index of the coolant to the light is changed, thereby correcting the image plane curve and also changing the lens power. The coolant is adjusted in a manner such that when the screen size decreases, the refractive index is increased and, when the screen size increases, the refractive index is reduced.

DETAILED DESCRIPTION OF THE EMBODIMENT

An embodiment of the invention will be described hereinbelow with reference to the drawings.

Figure 2:
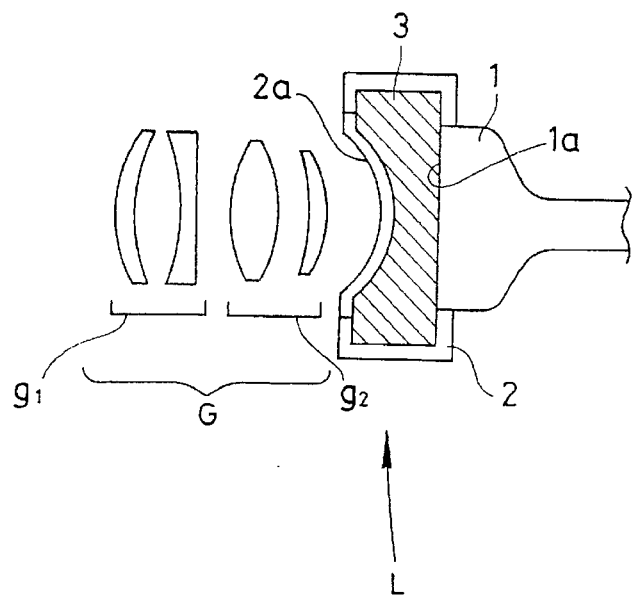
FIG. 2 is a diagram schematically showing the construction of a lens for a projection lens.

For the aforementioned image plane curve, there exists a concept of a Petzval's sum $\Sigma \cdot 1/ni \cdot fi$ (ni: refractive index, fi: focal length). To eliminate the image plane curve, it is sufficient to allow the Petzval's sum to approach to 0. When a size of screen decreases, a size of whole television set also decrease. In association with it, the focal distance f of the power lens group G must be reduced. When the focal distance f is decreased, the Petzval's sum positively increases and the image plane curve increases. To correct such a phenomenon, it is desirable to increase the value of the negative term of the focal distance f. Namely, in the projection television, a concave lens (liquid lens 3 in FIG. 2) having a large focal distance f is arranged just before the CRT. Such a concave lens is an image plane correcting lens called a field flattener. When the size of television set decreases, it is sufficient to decrease the focal distance. To correct the image plane, however, it is sufficient to increase the refractive index of the liquid lens 3 in FIG. 2.

The coolant 3 can be also made of a mixture liquid of two or more liquids. In such a case, however, by adjusting a mixing ratio, the refractive index can be easily changed. In place of changing a mixing ratio of a plurality of coolants, it is also possible to construct a liquid lens by a plurality of kinds of coolants and to change the kinds of coolants in accordance with each set size and to thereby correspond to the dimensions of the set size. By changing a refractive index, the Petzval's sum can be allowed to approach 0 and the image plane curve can be effectively corrected.

That is, as shown in Table 1, glycerine, silicon oil, silicon gel, water, ethylene glycol, etc. can be used as a coolant for the liquid lens. Since their refractive indices are different, the kinds of those coolants are properly selected so that the resultant refractive indices correspond to the appropriate size of the screen, respectively.

TABLE 1

| Material name | Refractive index | $(d_n/dT) \times 10^{-4}$ |
| --- | --- | --- |
| glycerine | 1.473 | −2.2 |
| E1 | 1.443 | −2.9 |
| silicon oil | 1.403 | −3.2 |
| silicon gel | 1.405 | −3.2 |
| water | 1.333 | −1.0 |

Since the refractive indices of those liquids differ in dependence on the temperature, it is necessary to consider the temperature change dn/dT in accordance with a temperature of fluorescent surface 1a. The material name $E_1$ in Table 1 denotes a mixture liquid of 30% of glycerine and 70% of ethylene glycol. The temperature of mixture liquid in this instance is set to 30° C.

Figure 1A:
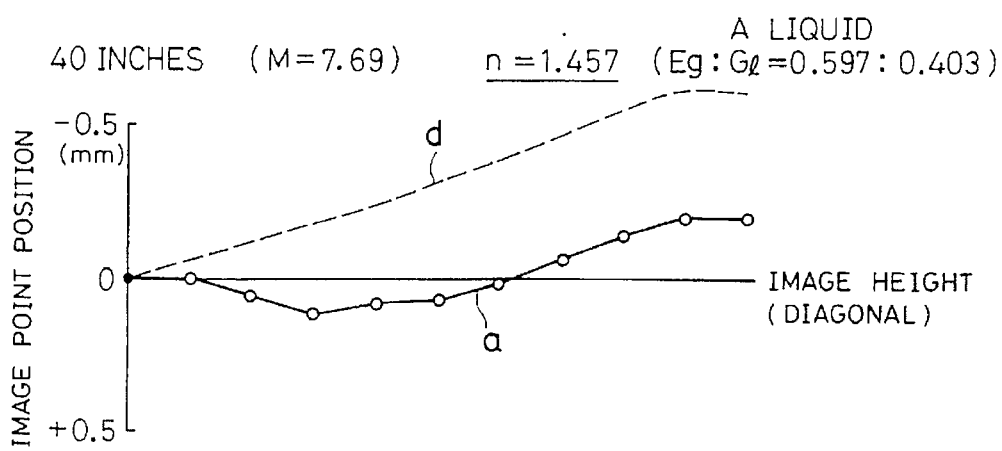
FIGS. 1A through 1C are diagrams each showing an image point position at each position of a screen in the case where the image point position in case of changing a mixing ratio of a mixed liquid is changed according to the present invention.
Figure 1B:
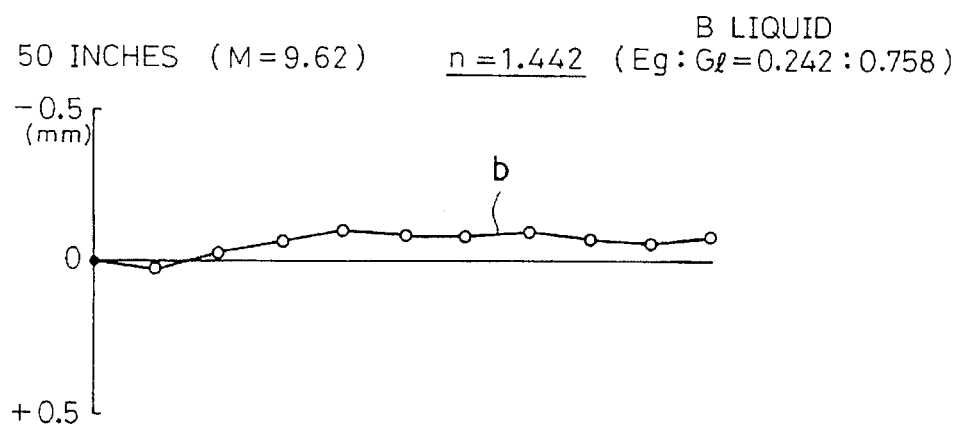
Figure 1C:
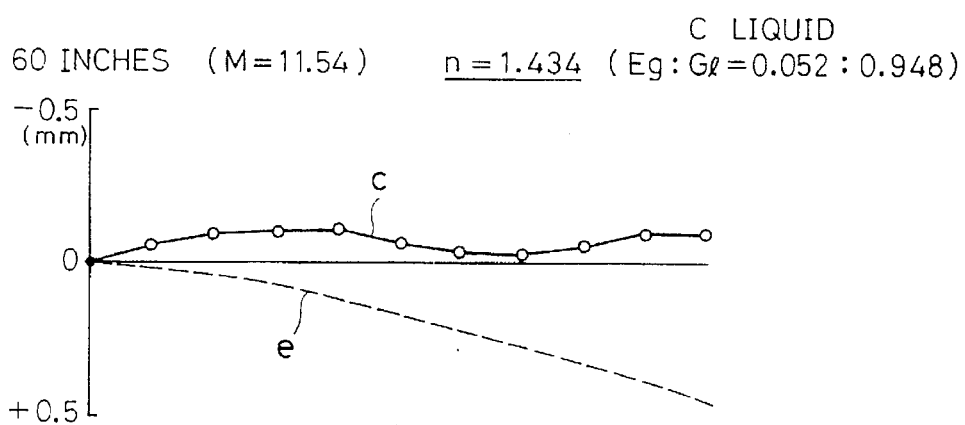

FIGS. 1A through 1C are diagrams each showing the change in image point position to each position from the center of the screen at a temperature of 20° C. in the case where a mixing ratio of ethylene glycol (whose refractive index n=1.4318) and glycerine is changed corresponding to the size of screen.

FIG. 1A shows a change in image point position on the CRT in the case where the screen size is 40 inches and a magnification M of the projection lens L is 7.69 and a mixture A liquid (refractive index n=1.457) in which a ratio of (ethylene glycol:glycerine) is (0.597:0.403) is used as a liquid lens. Specifically, an axis of ordinate indicates the image point position and an axis of abscissa shows each position (image height) along a diagonal line from the center of a CRT raster. A change in image point position in this case is shown by a curve a. A distance from the axis of abscissa to each point indicates a degree of deviation of the image point position. At a temperature of 20° C., a refractive index n of ethylene glycol is equal to 1.4318 and n of glycerine is equal to 1.473. As mentioned above, in the A liquid, a large image distortion doesn't occur at each position of the screen.

FIG. 1B shows the relation between the image height and the image point position in the case where the screen size is 50 inches and the magnification M of the projection lens L is 9.62 and a mixture B liquid in which a mixing ratio of (ethylene glycol:glycerine) is (0.242:0.758) is used as a liquid lens. A deviation of the image point position is shown by a curve b. The refractive index n of the mixture B liquid is equal to 1.442. In this case as well, a large deviation doesn't occur at each position of the screen.

In FIG. 1C, a curve c shows a deviation of the image due to a mixture C liquid in the case where the screen size is 60 inches and the magnification M of the projection lens L is 11.54 and the mixture C liquid in which a mixing ratio of (ethylene glycol:glycerine) is (0.052:0.948), namely, the liquid almost entirely consists of glycerine as used for the liquid lens. The refractive index n of the mixture C liquid is equal to 1.434. Even by using such a mixing ratio, a large deviation occurs at each position of the screen. In FIG. 1A, in case of using the mixture B liquid in place of the mixture A liquid, the deviation is large as shown by a curve d. As shown in FIG. 1C, in case of using the mixture B liquid in FIG. 1B in a TV set of the screen size of 60 inches, it will be understood that the deviation of the image increases as shown by a curve e as the position of image approaches the edge of the screen of the diagonal line from the center of the screen.

That is, it will be understood that the deviation can be eliminated by changing the mixing ratio of the coolants correspondingly to the size of each screen.

From the above points, even by changing the material of coolant, for example, by changing the liquid materials having the above refractive indices correspondingly to the size such as 40 inches, 50 inches, and the like, the image deviation can be similarly eliminated.

As for a temperature change, it is necessary to select a mixing ratio while considering the actual using state of the projection television.

Figure 3:
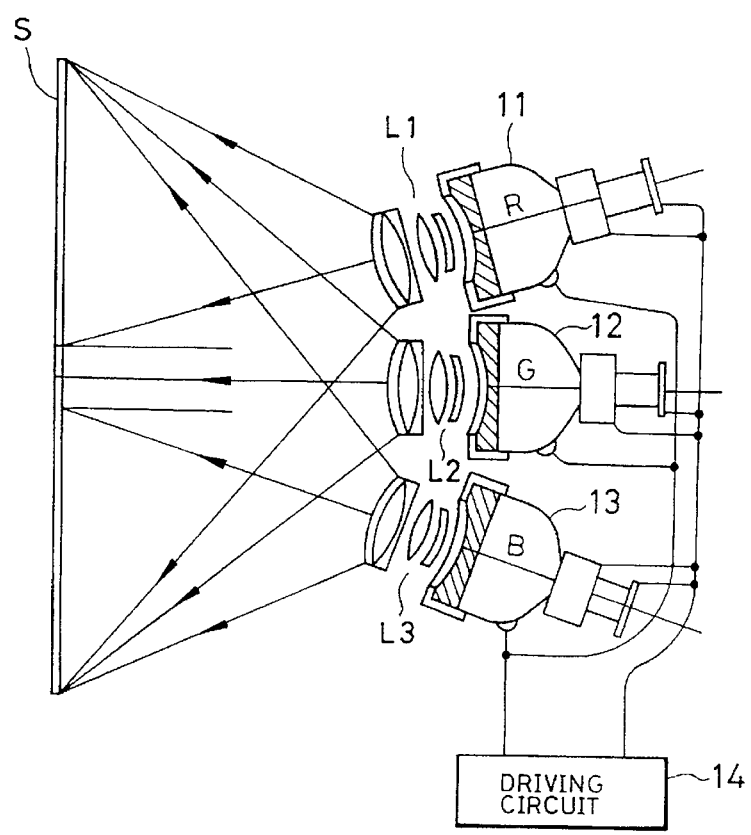
FIG. 3 is a schematic diagram showing a rear-projection type projection television using three projection lenses according to the present invention.

FIG. 3 shows an example of a rear projection television having three cathode-ray tubes 11, 12 and 13 for R (red), G (green), B (blue) colors, which are driven by signals from a driving circuit 14. The cathode-ray tubes 11 through 13 are positioned at angularly different positions with respect to a screen S, and are respectively provided with projection lenses L1, L2, and L3. Since the general arrangement of the lens group in each of the projection lenses L1 through L3 is similar to that shown in FIG. 2, the explanation thereof will not repeated. However, the liquid lens in each of the projection lenses L1 through L3 is produced according to the present invention so as to have the characteristic explained with reference to FIGS. 1A through 1C.

In the description of the above embodiment, the present invention has been described by way of an example of a rear-projection type display where the projection light is projected from behind of a screen. The application of the present invention is, however, not limited to the rear projection type display. Rather, the invention can also be applicable to a front-projection type display as far as a liquid lens is utilized.

Since the liquid lens according to the invention is constructed as mentioned above, it is possible to easily match the inch size of screen by exchanging the coolant and there is no need to change the lens arrangement of the power lens group. It is, therefore, possible to easily and cheaply provide an optimum lens performance correspondingly to each screen size.

Furthermore, besides the case where a CRT is used as a projection tube, the present invention is applicable to cases where a dichroic mirror, immersed in a liquid for the purpose of preventing the temperature rise of such dichroic mirror or liquid crystals arranged in the optical paths, is used to converge lights of RGB colors to a single projection lens, from which emerges a projection light. In such cases, the features according to the present invention are applied to create an optimum coupling of such liquid to the projection lens.

What is claimed is:

1. An adaptable lens system for use in projection televisions having screens of varying size, comprising:

a picture generating means for generating light representing an image to be displayed on a projection television, a selected liquid lens disposed adjacent to said picture generating means for cooling said picture generating means and for altering said image so as to properly display said image on a desired specific screen size of the projection television, wherein said selected liquid lens comprises a selected mixture of liquid materials selected from a plurality of mixtures of liquid materials, each of said mixtures having a refractive index different from refractive indices of the other mixtures and corresponding to a specific screen size, said selected mixture selected to achieve a desired refractive index corresponding to the desired specific screen size of the projection television in which the adaptable lens system is to be installed;

a coupler for coupling said selected liquid lens adjacent to said picture generating means, and a fixed lens means comprising a plurality of lenses unmovably attached in the adaptable lens system for focusing the altered image on the screen of the projection television.

2. An adaptable lens system for use in projection televisions having screens of varying sizes comprising:

a picture generating means for generating light representing an image to be displayed on a projection television, a selected liquid lens disposed adjacent to said picture generating means for cooling said picture generating means and for altering said image so as to properly display said image on a desired specific screen size of the projection television, wherein said selected liquid lens comprises a liquid consisting essentially of a uniform liquid material selected from a group of liquids, each of said group of liquids having a refractive index different from refractive indices of the other liquids in said group of liquids and corresponding to a specific sized screen, said uniform liquid material having a desired refractive index corresponding to the desired specific size of a screen in the projection television in which the adaptable lens system is to be installed;

a coupler for coupling said selected liquid lens adjacent to said picture generating means; and a fixed lens means comprising a plurality of lenses unmovably attached in the adaptable lens system for focusing the altered image on the screen of the projection television.

3. A projection lens as claimed in claim 2 wherein said projection television is a rear-projection type projection television, wherein the fixed lens system is commonly used for a specific screen size, and wherein said mixing ratio of said liquid materials is selected to produce a smaller refractive index of the mixture of liquid as the screen size increases.

4. A projection apparatus for projecting color video images comprising:

a plurality of projection cathode-ray tubes for generating video images;

a plurality of projection lenses, each corresponding to one of the projection cathode-ray tubes, for magnifying and projecting the video image from the projection cathode-ray tubes to a screen; and a coupling means for coupling each of said plurality of projection cathode-ray tubes to a corresponding projection lens, said coupling means comprising a selected liquid material, selected from a group of liquids, each having a refractive index different from refractive indices of the other liquids in the group of liquids, said selected liquid material having a refractive index selected to correspond to the size of said screen.

5. A method of magnifying and correcting light from a projection cathode-ray tube that displays video images based upon a video signal, said method comprising the steps of:

selecting a liquid material for use in a liquid lens corresponding to a desired screen size, said liquid material being selected from a group of liquid materials each having a refractive index different from refractive indices of the other liquid materials in the group of liquid materials and corresponding to one of a plurality of varying screen sizes;

providing video images on said projection cathode-ray tube corresponding to the video signal;

receiving said video images from said projection cathode-ray tube by said liquid lens adjacent to said projection cathode-ray tube including said liquid material; and providing an optical coupling by contacting said liquid material to a projection lens for projecting said video images toward the large screen.

6. A method as claimed in claim 5, wherein said liquid material is selected to produce a desired refractive index of said liquid material so that said video images are properly displayed on said large screen.

7. A method as claimed in claim 6, wherein a mixing ratio of said liquid material is determined to produce a desired refractive index of said liquid material so that said video images are properly displayed on said large screen.

8. A projection apparatus as claimed in claim 5, wherein said plurality of projection cathode-ray tubes are three cathode-ray tubes respectively for red, green, and blue, and wherein said coupling provides an optical coupling between each of said cathode-ray tubes and each of said projection lenses by said at least a liquid material.

9. A projection apparatus as claimed in claim 5 wherein said liquid material includes glycerine and ethylene glycol.

10. A projection apparatus as claimed in claim 5 wherein said plurality of projection cathode-ray tubes are three cathode-ray tubes respectively for red, green, and blue, and wherein said coupling means provides an optical coupling between each of said cathode-ray tubes and each of said projection lenses by said liquid material.

11. A method of magnifying and correcting light from a projection cathode-ray tube that displays video images based upon a video signal, said method comprising the steps of:

selecting a liquid material for use in a liquid lens corresponding to a desired screen size, said liquid material being selected from a group of liquid materials each having a refractive index different from refractive indices of the other liquid materials in the group of liquid materials and corresponding to one of a plurality of varying screen sizes;

producing video images on said projection cathode-ray tube corresponding to the video signal;

receiving said video images from said projection cathode-ray tube by said liquid lens adjacent to said projection cathode ray tube including said liquid material; and providing an optical coupling by contacting said liquid material to a projection lens for projecting said video images toward the large screen.

* * * * *